United States Patent [19]

Kranis, Jr.

[11] Patent Number: 4,863,214
[45] Date of Patent: Sep. 5, 1989

[54] SPACER TUBE MATRIX

[75] Inventor: Daniel Kranis, Sr., Wernersville, Pa.

[73] Assignee: Dana Corporation, Toledo, Ohio

[21] Appl. No.: 273,382

[22] Filed: Nov. 17, 1988

[51] Int. Cl.4 .............................................. B62D 21/00
[52] U.S. Cl. .................................... 296/203; 296/204; 52/731; 280/797
[58] Field of Search ......................... 296/203, 204, 205; 52/731; 280/797

[56] References Cited

U.S. PATENT DOCUMENTS

| Re. 18,750 | 2/1933 | Tarbax | 280/797 |
|---|---|---|---|
| 1,724,845 | 8/1929 | Lancia | 280/781 |
| 1,978,055 | 10/1934 | McKinley | 280/106 |
| 2,009,963 | 7/1935 | Matthaei | 280/797 |
| 2,177,991 | 10/1939 | Maddock | 280/797 |
| 2,327,585 | 8/1943 | Ulrich | 280/797 |
| 2,883,232 | 4/1959 | Oldey et al. | 280/797 |
| 3,173,520 | 3/1965 | Fisher | 189/34 |
| 3,622,171 | 11/1971 | Gottschalk | 296/204 |
| 3,757,481 | 9/1973 | Skinner | 52/265 |
| 4,050,753 | 9/1977 | Scherrer | 52/731 |
| 4,297,154 | 10/1981 | Keller | 156/79 |
| 4,369,217 | 1/1983 | Leistritz | 280/797 |
| 4,407,878 | 10/1983 | Smith et al. | 428/119 |
| 4,452,657 | 6/1984 | Hamm | 156/198 |
| 4,580,380 | 4/1986 | Ballard | 52/309.9 |
| 4,610,836 | 9/1986 | Wycech | 264/313 |
| 4,646,505 | 3/1987 | Paris | 52/731 |

Primary Examiner—Robert R. Song
Attorney, Agent, or Firm—Robert M. Leonardi

[57] ABSTRACT

A vehicle frame of box beam construction containing within the box beam a spacer tube matrix or web which positons spacer tubes in alignment with aligned apertures within the sidewall of the box beam. The spacer tubes allow substantial clamping force to be applied by bolts passing thru the aligned apertures to attach vehicle parts to the frame.

9 Claims, 2 Drawing Sheets

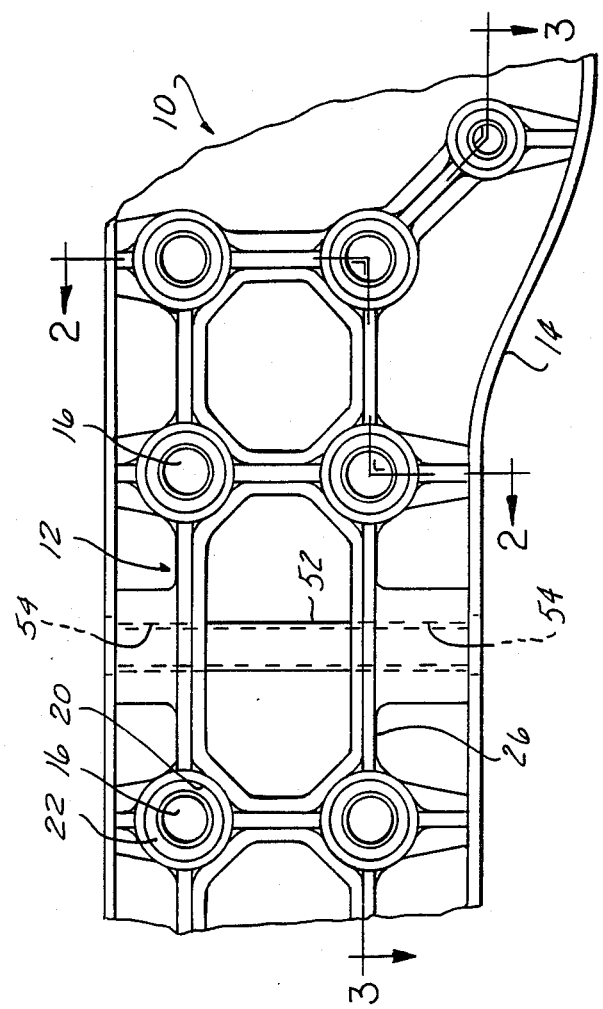
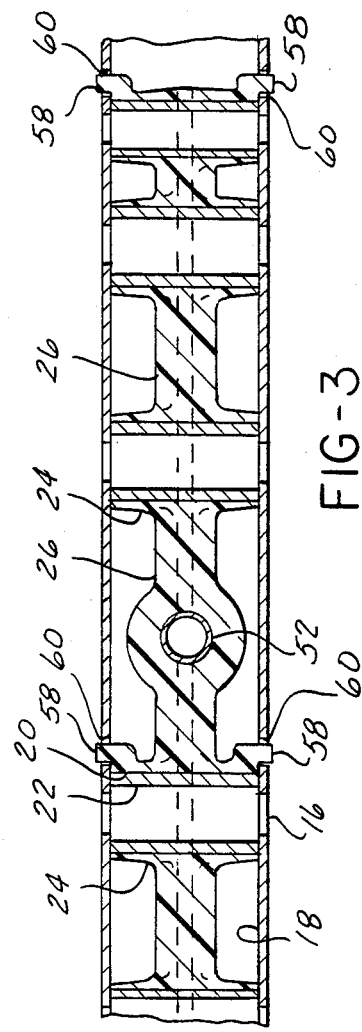

SPACER TUBE MATRIX

BACKGROUND OF THE INVENTION

1. Field of the Invention

The present invention generally relates to the field of frames and, in particular, the present invention is concerned with frames made from a structural box beam construction.

II. Background of the Invention

The ideal vehicle frame has a high strength to weight ratio, maintains its shape under heavy stress, and provides a convenient means for fastening various parts of the vehicle such as bodybolts, suspension system, exhaust system, engine transmission etc. to the frame. In addition the ideal vehicle frame must be inexpensive to produce. A vehicle frame having hollow box frame siderails meets many of the above requirements. Heretofor, the methods employed for attaching the various parts to the frame in a box frame construction have detracted from the goals of lightweight and low cost. In the past, the users of box frames welded flanges, projections, and reinforcing pads to the siderail to provide the attacment points required for the various vehilce parts. However, welding pads etc. to the box frame adds weight and is costly. The placing of aligned apertures in the siderails through which fasteners such as bolts can be inserted is attractive, but the walls of the box beam must be heavy enough to withstand the bolt tension without collapsing. Inserts of cast iron or steel placed inside the box frame between the sides of the box with the bolt passing through the insert effectivly prevent collapsing of the walls but add weight. In addition, these inserts must be positioned properly before the box is closed and held in position until the bolts are inserted. Spacer tubes that extend between the sides of a box frame are ideal in that they weigh very little and are not expensive and they prevent the collapsing of the sides of a box frame when the bolts or attachment means are tightened. The spacer tubes must be held in position while the box beam is closed and the tubes must be held in alignment with their appropriate aperture in the siderail during the assembly process. In the past, this has been accomplished by tack welding the tube in position over the aperture in the sidewall of the box frame. This is expensive and awkward since the welder must first position the tube over the appropriate aperture and then close his helmet and strike the arc to tack weld the tube in place. The welder is essentially blind until the arc is struck and the tube can move slightly out of position during the welding. Furthermore, the cooling of the weld bead may move the tube out of position or cause the tube to cock and go out of perpendicularity with the sidewall of the frame. This requires a straightening procedure which is time consuming and expensive.

SUMMARY OF THE INVENTION

The present invention, which will be described in greater detail hereinafter, comprises a structural beam of box type construction for vehcile frames comprising a first longitudinal member having a generally U-shaped cross section and a second longitudinal member adapted to be assembled to the first longitudinal member to form a hollow box type beam. A plurality of pairs of aligned apertures are formed in a pattern in opposed walls of the beam. A plurality of hollow spacers extend between at least some of the aligned pairs of apertures and a spacer tube matrix is employed which comprises a web for supporting and positioning the spacers in alignment with the aligned pairs of apertures. The web has a pattern of apertures complimentary to the pattern of apertures in the opposed walls, and in a preferred embodiment the web is configured to snuggly engage the spacers and hold them in position during assembly of the spacers to one side of the hollow beam prior to closing of the beam. Employing the web of the present invention requires only the tack welding of two of the spacers to their appropriate aligned aperture, and the remaining spacers are automaticlly aligned with the apertures in the opposed wall, thus saving considerable time and expense in the assembly of the spacers to the sidewalls.

Further advantages, and applications of the present invention will become apparent to those skilled in the art of vehicle frames when the accompaning description of one example of the best mode contemplated for practing the invention is read in conjunction with the accompaning drawing.

BRIEF DESCRIPTION OF THE DRAWING

The description herein makes reference to the accompanying drawing wherein like reference numbers refer to like parts throughout the various several views, and wherein:

FIG. 1 illustrates a broken open box beam with the upper side removed to reveal the inner portions of the beam;

FIG. 3 illustrates a longitudinal cross section of a closed box beam taken along the line 3—3 of FIG. 1;

DESCRIPTION OF A PREFERRED EMBODIDMENT

Figure 2:
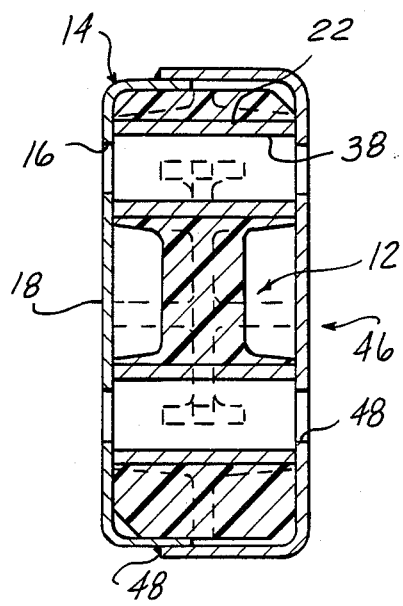
FIG. 2 illustrates a closed box beam of the type illustrated in FIG. 1 with a section taken along the line 2—2 of FIG. 1.

Referring now to the drawing, there is illustrated in FIG. 1 one example of the present invention in the form of an open box beam 10 employing a siderail spacer tube matrix or web 12. The web 12 is positioned within a first longitudinal member 14. The first longitudinal member 14 includes a plurality of apertures 16 formed in the sidewall 18 of the longitudinal member. The web 12 includes a plurality of web apertrues 20 configured to snuggly engage a plurality of spacer tubes 22. The plurality of web apertures 20 are arranged in a pattern identical to the plurality of apertures 16 in the first member sidewall 18. The web apertures 20 are formed in a web sidewall 24.

As can best be illustrated in FIG. 3 of the drawing the web sidewalls 24 are interconnected one to another by a plurality of interconnecting arms 26 which hold the web apertures 20 in the appropriate pattern. The web 12 can be made from a variety of materials such as plastic, die cast material, stamped steel etc. Care must be taken in the selection of the proper material for the web so that further processing of the assembled frame such as heating for the curing of coatings or stress relieving etc. does not distort the web and cause miss-location of the spacers 22.

In the preferred embodiment the web 12 includes appropriately positioned openings 28 in the web sidewall 24 so the spacers 22 can be tack welded by a weld bead 30 to hold the spacers in position during closure of the beam.

Figure 4:
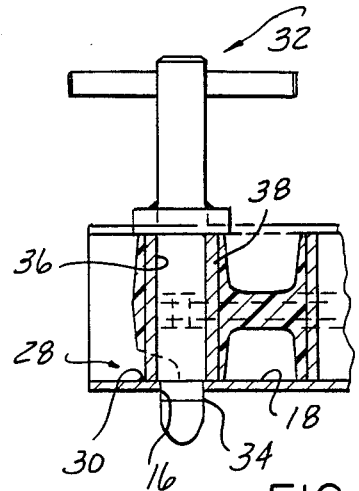
FIG. 4 illustrates a crosssectional view of a box beam with the web and tubular spacer in place and an assembly tool employed to aid in the placement of the spacer during assembly.

As shown in FIG. 4 of the drawing the web matrix 12 is conveniently positioned over the hole pattern in the sidewall of the longitudinal member 14 utilizing an assembly tool 32. The assembly tool 32 includes a first diameter 34 to snuggly engage the aperture 16 and second diameter 36 to engage the spacer tube inside diameter 38 and align the spacer tube with the aperture 16.

Figure 5:
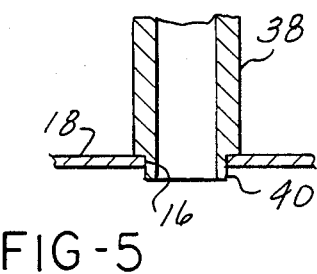
FIG. 5 illustrates a spacer having a stepped shoulder to snuggly engage the aperture and secure the spacer tube in place during assembly.

FIG. 5 illustrates a spacer tube 38 having a reduced diameter 40 to snuggly engage the aperture 16 and hold the spacer tube in alignment with the aperture 16.

Figure 6:
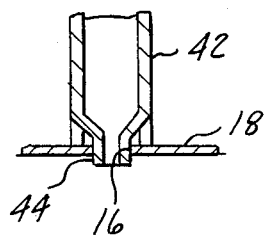
FIG. 6 illustrates a spacer tube employing a projection tab configured to snuggly engage the aperture in the side wall of the beam.

FIG. 6 of the drawing illustrates another configuration for the spacer tube 42. The spacer tube 42 has formed on its end a pair of opposed tabs 44 that are spaced to snuggly engage the aperture 16 and align the spacer 42 with the aperture 16.

Figure 7:
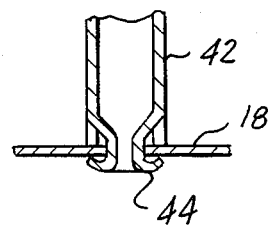
FIG. 7 illustrates the tab of FIG. 6 bent over to engage the wall of the beam and securely hold the spacer in place.

FIG. 7 illustrates how the tabs 44 can be bent over to abut the sidewall 18 and secure the spacer 42 to the sidewall.

FIG. 2 of the drawing illustrates a cross-sectional view of the box beam of the present invention in a prefered configuration with the box beam closed, welded, and ready for use. The prefered embodiment configuration as shown in FIG. 2 of the drawing, is assembled by first placing the first longitudinal member open side up in a jig or on a bench. Then the siderail spacer tube matrix or web 12 has spacer tubes 22 inserted in the web apertures 20. The web 12 is placed inside the first longitudinal member 14 and two of the spacer tubes 22 are aligned with two of the apertures 16 utilizing the assembly tool 32 as illustrated in FIG. 4. A weld bead 30 is then deposited to secure two spacer tubes 22 to the sidewall 18. When the tack welding is complete the assembly tool 32 is removed and a second longitudinal member 46 is placed over the first longitudinal member 14 with the second longitudinal member apertures 48 aligned with their corresponding spacer tube inside diameters 38, and the assembly is completed and the box beam formed by the placement of a second weld bead 48 along the joint between the first longitudinal member 14 and the second longitudinal member 46.

As shown in FIGS. 1 and 3 of the drawing, the web 12 can also be configured to support one or more vertical tubes 52 in a plane perpendicalar to the plane of the spacer tubes 22. The tube 52 is supported in a pair of aligned bores 54 which place the vertical tubes 52 in alignment with opposed aligned vertical apertures 56.

FIG. 3 of the drawing illustrates how alignment of the web 12 with the plurality of apertures 16 can be facilitated by employing a plurality of tabs 58 which snugly engage complimentary apertures 60 formed in the longitudinal members 14 and 46 and align the web 12 with the first longitudinal member 14 and the second longitudinal member 46.

It can thus be seen that the present invention has provided a new and improved box beam vehicle frame that is both strong and lightweight and can withstand considerable bolt load on the bolts that attach vehicle parts to the frame. The latteral support that the web provides the spacer tubes further enhances the strength of the spacer tubes and can prevent buckling of the spacer tubes to a considerable degree. This lends the possibility of using even lighter spacer tubes to reduce weight and still have adequate strength within the vehicle frame. Clearly, the above described invention provides a lightweight, strong, and economically produceable vehicle frame.

It should be understood by those skilled in the art of vechile frames that other forms of the applicants invention may be had, all coming within the spirit of the invention and scope of the appended claims.

Having thus described my invention what I claim is:

1. In a structural beam of the type comprising a first longitudinal member having a generally U shaped cross section,
    a second longitudinal member adapted to be assembled to said first longitudinal member to form a hollow beam,
    a plurality of pairs of aligned apertures arrranged in a pattern in opposed walls of said beam,
    a plurality of spacers extending between at least some of said aligned pairs of apertures,
    The improvement comprising a web supporting and positioning said spacers in alignment with said aligned pairs of apertures.

2. A vehicle frame assembly comprising, in combination;
    a first frame member having a generally u-shaped cross section,
    a second frame member assembled to said first frame member to form a hollow beam,
    a plurality of pairs of aligned apertures arranged in a pattern in opposed walls of said beam,
    a subassembly including a plurality of spacers disposed in a pattern corresponding to at least a portion of said pattern of said aligned pairs of apertures, and
    a web supporting and positioning said spacers disposed in said pattern, whereby said subassembly may be disposed within one of said first or second members prior to its assembly with the other of said first or second members and said plurality of spacers are aligned with at least said portion of said plurality of pairs of apertures.

3. The structural beam as defined in claim 1 further comprising means for aligning at least one of said plurality of spacers with at least one of said plurality of pairs of aligned apertures.

4. The structural beam as defined in claim 3 wherein said means comprises a reduced diameter at one or both ends of one of said plurality of spacers to snugly engage one of said plurality of aligned apertures.

5. The structural beam as defined in claim 3 wherein said means comprises a pair of opposed tabs extending from the end of at least one of said plurality of spacers, said opposed tabs spaced to snugly engage one of said plurality of aligned apertures.

6. The structural beam as defined in claim 5 further comprising said opposed tabs extending through said one of said plurality of aligned apertures and bent over against said beam to secure said tabs in place.

7. The structural beam as defined in claim 3 where in said means comprises two or more tabs extending from said web to engage complimentary apertures formed in said longitudinal members.

8. A vehicle frame assembly comprising a first frame member having a generally U-shaped cross section, said first frame member comprising a first wall, a second frame member attached to said first frame member to form a hollow beam, said second frame member having a second wall parallel to and spaced from said first wall, a first plurality of apertures in said first wall, a second plurality of apertures in said second wall, each of said second plurality of apertures being aligned with an aperture in said first wall, a unitary web extending between said first and second walls, said web having a plurality of apertures perpendicular to said first and second walls, each of said plurality of web aperatures aligned with one each of said first and second apertures.

9. A vehicle frame assembly as defined in claim 8 further comprising a third wall and a fourth wall parallel to said third wall, said third and fourth walls being perpendicular to said first and second walls to form said hollow beam, said third wall having an aperture and said fourth wall having an aperture aligned with said third wall aperture, said web further extending between said third and fourth walls, and said web further having a transverse aperture extending perpendicularly between said third and fourth walls, said transverse aperture aligned with said third and fourth wall apertures.

* * * * *